United States Patent
Sugie et al.

(10) Patent No.: US 10,035,482 B2
(45) Date of Patent: Jul. 31, 2018

(54) MOUNTING STRUCTURE FOR VICINITY INFORMATION DETECTION SENSOR

(71) Applicant: TOYOTA JIDOSHA KABUSHIKI KAISHA, Toyota-shi (JP)

(72) Inventors: Kazuki Sugie, Miyoshi (JP); Masanobu Ohmi, Kasugai (JP); Seiji Yamamoto, Seto (JP); Yoshiaki Matsumura, Toyota (JP); Kosuke Sakakibara, Toyota (JP); Misato Kinoshita, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/482,080

(22) Filed: Apr. 7, 2017

(65) Prior Publication Data
US 2017/0297521 A1 Oct. 19, 2017

(30) Foreign Application Priority Data
Apr. 19, 2016 (JP) .................. 2016-083774

(51) Int. Cl.
*B60R 19/48* (2006.01)
*B60K 11/08* (2006.01)
(Continued)

(52) U.S. Cl.
CPC ............ *B60R 19/483* (2013.01); *B60K 11/08* (2013.01); *B62D 25/18* (2013.01); *G01S 7/4813* (2013.01); *G01S 7/521* (2013.01); *G01S 13/931* (2013.01); *G01S 15/931* (2013.01); *G01S 17/936* (2013.01); *B60R 2019/486* (2013.01); *G01S 2013/9385* (2013.01); *G01S 2015/937* (2013.01); *G01S 2015/938* (2013.01)

(58) Field of Classification Search
CPC . B60R 19/483; B60R 2019/486; B60K 11/08; B62D 25/18; G01S 17/936; G01S 15/931; G01S 2015/938
USPC .............................................. 296/198, 187.1
See application file for complete search history.

(56) References Cited

U.S. PATENT DOCUMENTS 6,133,851 A * 10/2000 Johnson .................. B60Q 1/30
340/431
6,891,563 B2 * 5/2005 Schofield .................. B60R 1/00
348/143
(Continued)

FOREIGN PATENT DOCUMENTS

JP 5-223933 9/1993
JP 2007-112338 5/2007
(Continued)

*Primary Examiner* — Jason S Morrow
*Assistant Examiner* — E Turner Hicks
(74) *Attorney, Agent, or Firm* — Oblon, McClelland, Maier & Neustadt, L.L.P.

(57) ABSTRACT

A mounting structure for a vicinity information detection sensor, comprising: an apron upper member arranged along a vehicle front-and-rear direction at a vehicle width direction outer side of a vehicle front portion; and a vicinity information detection sensor equipped with a detection unit that detects vicinity information of the vehicle, the vicinity information detection sensor being mounted to the apron upper member, directly or via a bracket, such that the detection unit is oriented to the vehicle outer side.

8 Claims, 4 Drawing Sheets

(51) Int. Cl.
*B62D 25/18* (2006.01)
*G01S 15/93* (2006.01)
*G01S 17/93* (2006.01)
*G01S 7/481* (2006.01)
*G01S 7/521* (2006.01)
*G01S 13/93* (2006.01)

(56) References Cited

U.S. PATENT DOCUMENTS

| | | | |
|---|---|---|---|
| 8,757,249 B2* | 6/2014 | Bandai | B60H 1/00278 165/202 |
| 9,499,099 B2* | 11/2016 | Heinemann | B60R 1/00 |
| 2007/0179712 A1* | 8/2007 | Brandt | G01S 13/931 701/300 |
| 2008/0297332 A1 | 12/2008 | Suzuki et al. | |
| 2008/0315050 A1* | 12/2008 | Buckley | B60R 19/483 248/205.1 |
| 2009/0095449 A1 | 4/2009 | Bandai et al. | |
| 2013/0024103 A1 | 1/2013 | Schneider | |
| 2013/0169425 A1* | 7/2013 | Victor | B60Q 1/525 340/435 |
| 2014/0111950 A1* | 4/2014 | Yamasaki | B60R 16/0239 361/747 |
| 2014/0247161 A1* | 9/2014 | Hallek | G01S 7/524 340/932.2 |

FOREIGN PATENT DOCUMENTS

| | | |
|---|---|---|
| JP | 2008-229562 | 10/2008 |
| JP | 2008-299562 A | 12/2008 |
| JP | 2013-518333 | 5/2013 |
| JP | 2013-116642 | 6/2013 |

* cited by examiner

MOUNTING STRUCTURE FOR VICINITY INFORMATION DETECTION SENSOR

CROSS-REFERENCE TO RELATED APPLICATION

This application is based on and claims priority under 35 USC 119 from Japanese Patent Application No. 2016-083774 filed on Apr. 19, 2016, the disclosure of which is incorporated by reference herein.

TECHNICAL FIELD

The present invention relates to a mounting structure for a vicinity information detection sensor.

BACKGROUND ART

As a structure equipped with a vicinity information detection sensor that detects lateral information of a vehicle, a structure is disclosed in Japanese Patent Application National Publication No. 2013-518333 in which a pair of sensor apparatuses (vicinity information detection sensors) are installed at the front and rear of a vehicle side portion.

Similarly, structures are disclosed in Japanese Patent Application Laid-Open (JP-A) No. 2008-229562 and Japanese Patent Application Laid-Open (JP-A) No. H05-223933, in which plural numbers of ultrasonic sensors (vicinity information detection sensors) are installed along the vehicle front-and-rear direction at both of side portions of a vehicle.

SUMMARY OF INVENTION

Technical Problem

However, the documents disclosed in Japanese Patent Application National Publication No. 2013-518333, Japanese Patent Application Laid-Open (JP-A) No. 2008-229562, and Japanese Patent Application Laid-Open (JP-A) No. H05-223933 do not recite specific mounting structures for the vicinity information detection sensors. There are calls for the establishment of mounting structures for making the mounting states of vicinity information detection sensors during running stable.

In consideration of the circumstances described above, an object of the present invention is to provide, for a structure equipped with a vicinity information detection sensor that detects lateral information of a vehicle, a mounting structure for the vicinity information detection sensor that may make a mounting state of the vicinity information detection sensor stable.

Solution to Problem

A mounting structure for a vicinity information detection sensor relating to a first aspect relating to the present invention includes: an apron upper member arranged along a vehicle front-and-rear direction at a vehicle width direction outer side of a vehicle front portion; and a vicinity information detection sensor equipped with a detection unit that detects vicinity information of the vehicle, the vicinity information detection sensor being mounted to the apron upper member, directly or via a bracket, such that the detection unit is oriented to the vehicle outer side.

In the mounting structure for a vicinity information detection sensor relating to the first aspect relating to the present invention, the vicinity information detection sensor is mounted to the apron upper member directly or via the bracket. The vicinity information detection sensor is equipped with the detection unit that detects vicinity information of the vehicle. In the state in which the vicinity information detection sensor is mounted, because the detection unit is oriented to the vehicle outer side, other vehicles running at the side of the vehicle, obstacles and so forth may be detected by the vicinity information detection sensor.

The vicinity information detection sensor is mounted to the apron upper member, which is a framework member. Therefore, vibrations that are applied to the vicinity information detection sensor during running may be moderated compared to a structure in which a vicinity information detection sensor is mounted only to a member with low stiffness such as an exterior panel or the like.

In a mounting structure for a vicinity information detection sensor relating to a second aspect relating to the present invention, in the structure according to the first aspect relating to the present invention, a fender panel is disposed at the vehicle width direction outer side of the apron upper member, and the vicinity information detection sensor is mounted to the apron upper member via the bracket and is disposed between the apron upper member and the fender panel.

In the mounting structure for a vicinity information detection sensor relating to the second aspect relating to the present invention, the detection unit may be disposed further to the vehicle width direction outer side than in a structure in which the vicinity information detection sensor is mounted directly to the apron upper member. Therefore, obstruction by components around the vicinity information detection sensor of the detection of vicinity information by the vicinity information detection sensor may be moderated.

In a mounting structure for a vicinity information detection sensor relating to a third aspect relating to the present invention, in the structure according to the second aspect relating to the present invention, wherein the vicinity information detection sensor is mounted to both the bracket and the fender panel.

In the mounting structure for a vicinity information detection sensor relating to the third aspect relating to the present invention, the mounting state of the vicinity information detection sensor may be made more stable than in a structure in which the vicinity information detection sensor is mounted only at the apron upper member.

In a mounting structure for a vicinity information detection sensor relating to a fourth aspect relating to the present invention, in the structure according to the third aspect relating to the present invention, wherein a region of the fender panel that opposes the detection unit is made open.

In the mounting structure for a vicinity information detection sensor relating to the fourth aspect relating to the present invention, the detection unit of the vicinity information detection sensor is exposed to the vehicle outer side through the opening of the fender panel. Therefore, a deterioration in detection accuracy of the vicinity information detection sensor due to soiling and the like of the fender panel may be suppressed.

In a mounting structure for a vicinity information detection sensor relating to a fifth aspect relating to the present invention, in the structure according to the first aspect relating to the present invention, wherein the vicinity information detection sensor is mounted directly to the apron upper member, and an end portion at the vehicle width direction outer side of the vicinity information detection sensor is disposed at a vehicle width direction inner side relative to an end portion at the vehicle width direction outer side of the apron upper member.

In the mounting structure for a vicinity information detection sensor relating to the fifth aspect relating to the present invention, the end portion of the vicinity information detection sensor at the vehicle width direction outer side thereof is disposed at the vehicle width direction inner side relative to the end portion of the apron upper member at the vehicle width direction outer side thereof. Therefore, when a collision body collides against the side face of the vehicle, a collision load is applied to the apron upper member before the vicinity information detection sensor. Therefore, damage to the vicinity information detection sensor may be moderated.

In a mounting structure for a vicinity information detection sensor relating to a sixth aspect relating to the present invention, in the structure according to any one of the first aspect to the fifth aspect relating to the present invention, an inlet aperture through which running wind flows into the vehicle interior is provided at a vehicle front side relative to the vicinity information detection sensor, and the vicinity information detection sensor is disposed in a ventilation channel for the running wind flowing into the vehicle interior.

In the mounting structure for a vicinity information detection sensor relating to the sixth aspect relating to the present invention, because the vicinity information detection sensor is disposed in the ventilation channel for the running wind, the vicinity information detection sensor may be cooled by the running wind during running.

Advantageous Effects of Invention

As described above, according to the mounting structure for a vicinity information detection sensor relating to the first aspect relating to the present invention, an excellent effect is provided in that, in a structure equipped with a sensor that detects lateral information of a vehicle, a mounting state of the sensor may be made stable.

According to the mounting structure for a vicinity information detection sensor relating to the second aspect relating to the present invention, an excellent effect is provided in that a detection field of the vicinity information detection sensor may be assured.

According to the mounting structure for a vicinity information detection sensor relating to the third aspect relating to the present invention, an excellent effect is provided in that detection accuracy of the vicinity information detection sensor may be improved.

According to the mounting structure for a vicinity information detection sensor relating to the fourth aspect relating to the present invention, an excellent effect is provided in that the detection accuracy of the vicinity information detection sensor may be excellently maintained.

According to the mounting structure for a vicinity information detection sensor relating to the fifth aspect relating to the present invention, an excellent effect is provided in that damage to the vicinity information detection sensor when there is a side collision of the vehicle may be suppressed.

According to the mounting structure for a vicinity information detection sensor relating to the sixth aspect relating to the present invention, an excellent effect is provided in that the vicinity information detection sensor may be cooled without the use of a dedicated cooling apparatus.

DESCRIPTION OF EMBODIMENTS

First Exemplary Embodiment

Herebelow, a vehicle in which a mounting structure for a vicinity information detection sensor according to a first exemplary embodiment of the present invention is employed is described with reference to the drawings. An arrow FR that is shown as appropriate in the drawings indicates a vehicle front side, an arrow UP indicates a vehicle upper side, and an arrow RH indicates a vehicle right side. In the following descriptions, where the directions front, rear, up, down, left and right are used without being particularly specified, the same represent the front and rear in the vehicle front-and-rear direction, up and down in the vehicle vertical direction, and left and right in case of facing in the running direction.

Figure 1:
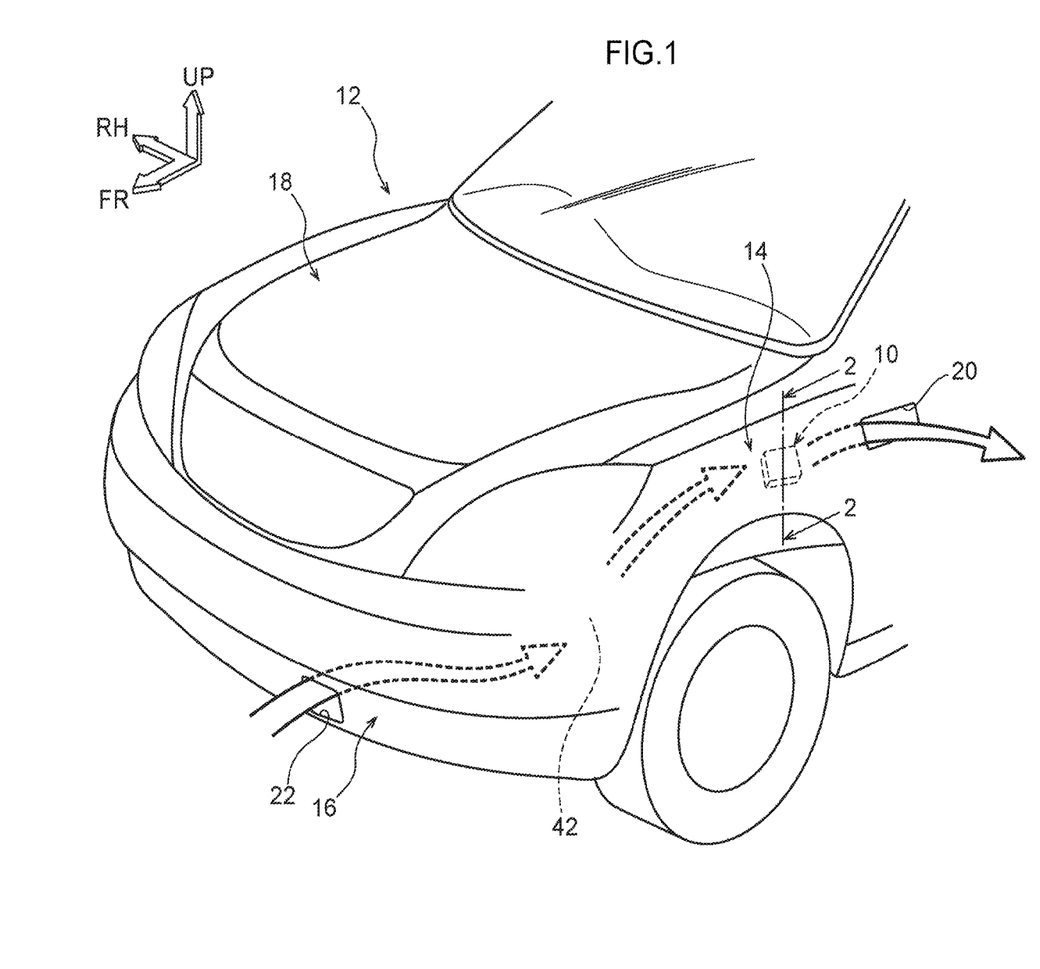
FIG. 1 is a perspective view schematically showing a front portion of a vehicle in which a vicinity information detection sensor in accordance with a first exemplary embodiment is installed.

As shown in FIG. 1, the mounting structure for a vicinity information detection sensor according to the present exemplary embodiment is employed in a vehicle 12. A hood 18 that covers an engine compartment, which is not shown in the drawings, from above is provided at a vehicle front portion of the vehicle 12. A fender panel 14 fabricated of resin is disposed at each of the two vehicle width direction sides of the hood 18. The fender panel 14 extends in the vehicle front-and-rear direction. A vicinity information detection sensor 10 according to the present exemplary embodiment is disposed at the inner side of the fender panel 14.

Figure 2:
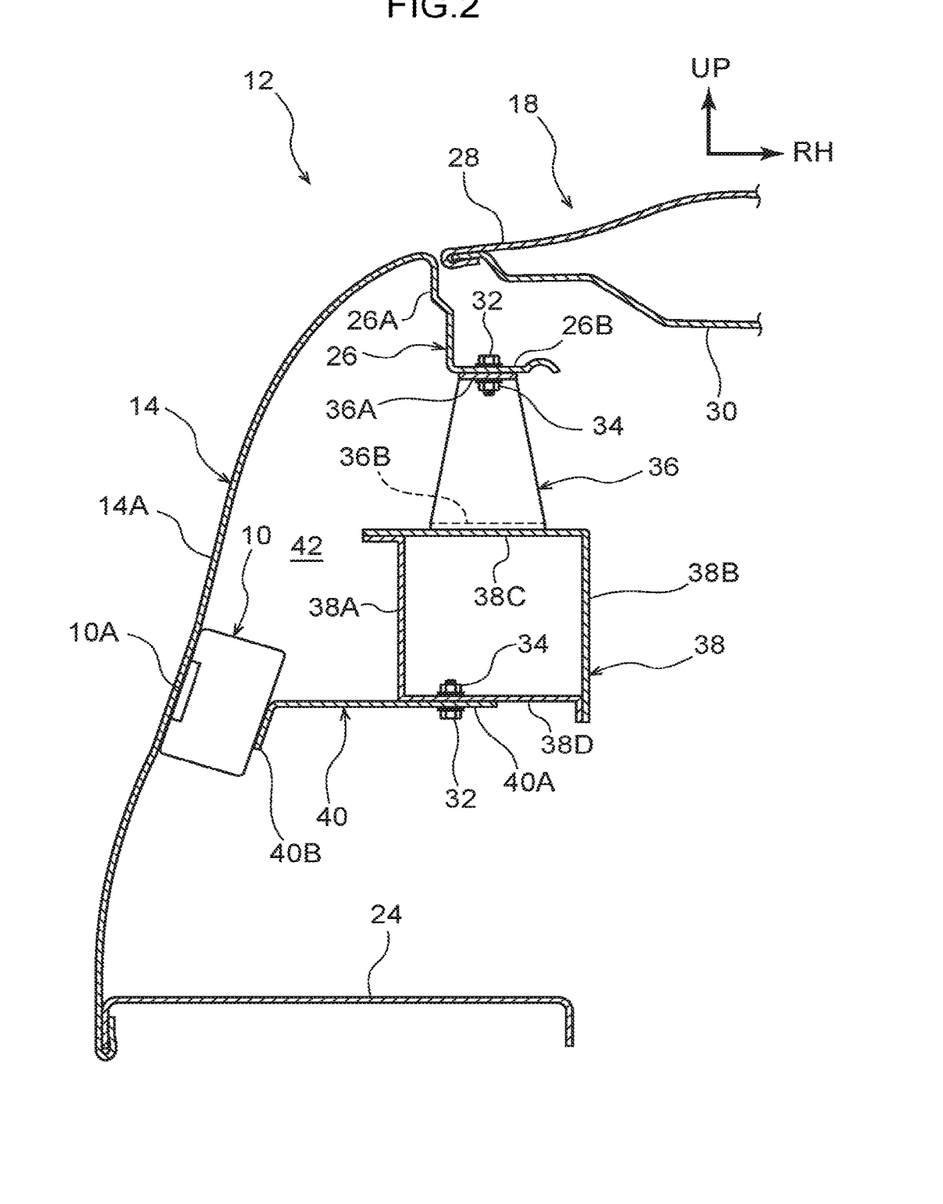
FIG. 2 is a sectional diagram showing a section cut along line 2-2 in FIG. 1.

As shown in FIG. 2, the fender panel 14 is provided with an upright wall portion 14A that, in a sectional view seen from the vehicle rear side, is inclined so as to be disposed further to the vehicle width direction outer side from the vehicle upper side toward the vehicle lower side. A fender liner 24 is assembled to a lower end portion of the upright wall portion 14A. In the sectional view seen from the vehicle rear side, the fender liner 24 is formed in a flattened substantial "U" shape of which the vehicle lower side is open. An upper portion of a front tire, which is not shown in the drawings, is covered by the fender liner 24.

A bracket mounting portion 26 is formed at an upper end portion of the fender panel 14. The bracket mounting portion 26 is continuous from the upright wall portion 14A. A support bracket 36, which is described below, is mounted to the bracket attachment portion 26. In the sectional view seen from the vehicle rear side, the bracket attachment portion 26 is formed in a substantial "L" shape, including a first wall 26A and a second wall 26B. The first wall 26A projects to the vehicle lower side from an upper end portion of the upright wall portion 14A. The second wall 26B projects to the vehicle width direction inner side from a lower end portion of the first wall 26A. The hood 18 is disposed at the vehicle upper side of the bracket attachment portion 26. The hood 18 is formed as a closed cross section structure including a hood outer panel 28 disposed at the upper side and a hood inner panel 30 disposed at the lower side. The hood outer panel 28 constitutes a design surface. A periphery edge portion of the hood 18 matches up in the vehicle width direction with the upper end portion of the fender panel 14.

The second wall 26B of the bracket attachment portion 26 is fastened to the support bracket 36 by a bolt 32 and nut 34. The support bracket 36 is a bracket that vertically connects the fender panel 14 with an apron upper member 38. Thus, the fender panel 14 is supported at the apron upper member 38 via the support bracket 36.

The support bracket 36 is a member that is formed in a substantial hat shape as viewed in the vehicle width direction. The second wall 26B of the bracket attachment portion 26 is fastened by the bolt 32 and nut 34 to an upper end portion of the support bracket 36. Respective flanges 36B project toward the vehicle front side and the vehicle rear side from a lower end portion of the support bracket 36. The flanges 36B are joined to the apron upper member 38 by adhesion or the like. The sectional diagram of FIG. 2 illustrates a state in which the support bracket 36 is sectioned at a vehicle front-and-rear direction middle region thereof. Thus, only the flange 36B that projects toward the vehicle front side is shown.

The apron upper member 38 is disposed at the vehicle width direction outer side of the vehicle front portion, and is a framework member that extends in the vehicle front-and-rear direction. The apron upper member 38 is formed as a closed cross section structure including an outer side wall 38A, an inner side wall 38B, an upper side wall 38C and a lower side wall 38D. The outer side wall 38A structures a wall portion at the vehicle width direction outer side. The inner side wall 38B structures a wall portion at the vehicle width direction inner side. The upper side wall 38C and lower side wall 38D structure vehicle upper side and lower side wall portions. In the present exemplary embodiment, the upper side wall 38C and the inner side wall 38B are formed by bending a single plate member, and the lower side wall 38D and the outer side wall 38A are formed by bending another single plate member. An upper end portion of the outer side wall 38A is bent toward the vehicle width direction outer side, and is joined to a lower face of the upper side wall 38C by welding or the like. Correspondingly, an end portion at the vehicle width direction inner side of the lower side wall 38D is bent downward and is joined to the inner side wall 38B by welding or the like. The term "closed cross section structure" used herein refers to a structure that forms a closed cross section when viewed as a whole member. Therefore, even if portions have open cross sections due to the formation of holes for the insertion of a welding torch, bolt holes and the like, the structure falls within the meaning of the term "closed cross section structure" provided a closed cross section is formed when the whole member is considered.

The vicinity information detection sensor 10 is mounted to the apron upper member 38 with the structure described above via a bracket 40. The bracket 40 is a plate member that extends in the vehicle width direction. In a state in which an end portion 40A at the vehicle width direction inner side of the bracket 40 is superposed with a lower face of the lower side wall 38D of the apron upper member 38, the bracket 40 is fastened to this lower face by the bolt 32 and nut 34. An end portion 40B at the vehicle width direction outer side of the bracket 40 is bent toward the vehicle lower side. The vicinity information detection sensor 10 is mounted to the end portion 40B by a fastening or the like, which is not shown in the drawings.

The vicinity information detection sensor 10 is formed in a substantially rectangular shape. The vicinity information detection sensor 10 is disposed between the apron upper member 38 and the fender panel 14, and is mounted to both the bracket 40 and the fender panel 14. In the present exemplary embodiment, the vicinity information detection sensor 10 is arranged along the upright wall portion 14A of the fender panel 14 and is mounted to the fender panel 14 via a bracket, which is not shown in the drawings.

The vicinity information detection sensor 10 is equipped with a detection unit 10A that detects vicinity information of the vehicle 12. The vicinity information detection sensor 10 is mounted to the bracket 40 and the fender panel 14 such that the detection unit 10A is oriented to the vehicle width direction outer side (the vehicle outer side). In the present exemplary embodiment, as an example, a millimeter wave radar is employed as the vicinity information detection sensor 10 and an electric wave transmission unit and reception unit constitute the detection unit 10A.

The above structure is not limiting; a laser radar, an ultrasound sensor, an optical camera or the like may be employed as the vicinity information detection sensor 10, and alternative sensors may be employed. If a laser radar is employed as the vicinity information detection sensor 10, a laser light emission unit and laser light reception unit constitute the detection unit. In this case, a region of the fender panel 14 opposing the detection unit is formed of a material capable of transmitting laser light. If an ultrasound sensor is employed as the vicinity information detection sensor 10, an acoustic transmitter and an acoustic receiver constitute the detection unit. In this case, a region of the fender panel 14 opposing the detection unit is formed of a material capable of transmitting ultrasound waves. If an optical camera is employed as the vicinity information detection sensor 10, a visible light detection unit constitutes the detection unit. In this case, a region of the fender panel 14 opposing the detection unit is formed of a material capable of transmitting visible light.

In the present exemplary embodiment, the vicinity information detection sensor 10 is disposed in a ventilation channel 42 for running wind. In specific terms, as shown in FIG. 1, an inlet aperture 22 through which running wind flows in is provided at a front bumper 16 that is disposed at a front end portion of the vehicle 12, and an outlet aperture 20 for the running wind is formed in the fender panel 14 at the vehicle rear side relative to the vicinity information detection sensor 10. Consequently, during running of the vehicle 12, the running wind flows in to inside the fender panel 14 through the inlet aperture 22, and the running wind flows along the ventilation channel 42 as illustrated by the arrows in FIG. 1 and flows out through the outlet aperture 20. The vicinity information detection sensor 10 is disposed in the ventilation channel 42.

Operation and Effects

Now, operation of the present exemplary embodiment is described.

The vicinity information detection sensor 10 according to the present exemplary embodiment is equipped with the detection unit 10A that detects vicinity information of the vehicle. In the state in which the vicinity information detection sensor 10 is mounted, the detection unit 10A is oriented to the vehicle width direction. Hence, other vehicles running at the side of the vehicle 12, obstacles and so forth may be detected by the vicinity information detection sensor 10.

This vicinity information detection sensor 10 is mounted via the bracket 40 to the apron upper member 38 that is a framework member with a closed cross section structure. Therefore, vibrations applied to the vicinity information detection sensor 10 during running may be moderated compared to a structure in which the vicinity information detection sensor 10 is mounted only to a member with low stiffness such as an exterior panel with an open cross section structure. That is, in a structure in which the vicinity information detection sensor 10 is mounted only to the fender panel 14, because large vibrations would be repeatedly applied to the vicinity information detection sensor 10 during running of the vehicle 12, it would be difficult to make the mounted state of the vicinity information detection sensor 10 stable. In contrast, because the vicinity information detection sensor 10 is mounted directly to the apron upper member 38 or the vicinity information detection sensor 10 is mounted to the apron upper member 38 via the bracket 40, vibrations applied to the vicinity information detection sensor 10 during running are moderated and the mounting state of the vicinity information detection sensor 10 may be made stable.

In the present exemplary embodiment, the bracket 40 projects from the apron upper member 38 and the vicinity information detection sensor 10 is mounted to the bracket 40. Thus, the vicinity information detection sensor 10 is disposed between the apron upper member 38 and the fender panel 14. Therefore, the detection unit 10A may be disposed further to the vehicle width direction outer side than in a structure in which the vicinity information detection sensor 10 is mounted directly to the apron upper member 38. As a result, obstruction by components around the vicinity information detection sensor 10 of the detection of vicinity information by the vicinity information detection sensor 10 may be moderated. That is, even if a detection field of the vicinity information detection sensor 10 is widened, limiting of the detection field of the detection unit 10A by nearby components may be suppressed, and the detection field may be assured.

In the present exemplary embodiment, the vicinity information detection sensor 10 is mounted to both the bracket 40 and the fender panel 14. Therefore, the mounting state of the vicinity information detection sensor 10 may be made more stable than in a structure in which the vicinity information detection sensor 10 is mounted only at the apron upper member 38. Thus, detection accuracy of the vicinity information detection sensor 10 may be improved.

The present exemplary embodiment has a structure in which running wind is taken in to the inside of the fender panel 14 and the vicinity information detection sensor 10 is disposed in the ventilation channel 42 for the running wind. Therefore, the vicinity information detection sensor 10 may be cooled during running of the vehicle 12. Thus, the vicinity information detection sensor 10 may be cooled without the use of a dedicated cooling apparatus. Furthermore, because there is no need to mount a cooling apparatus, the number of components may be reduced.

Variant Example of the First Exemplary Embodiment

Figure 3:
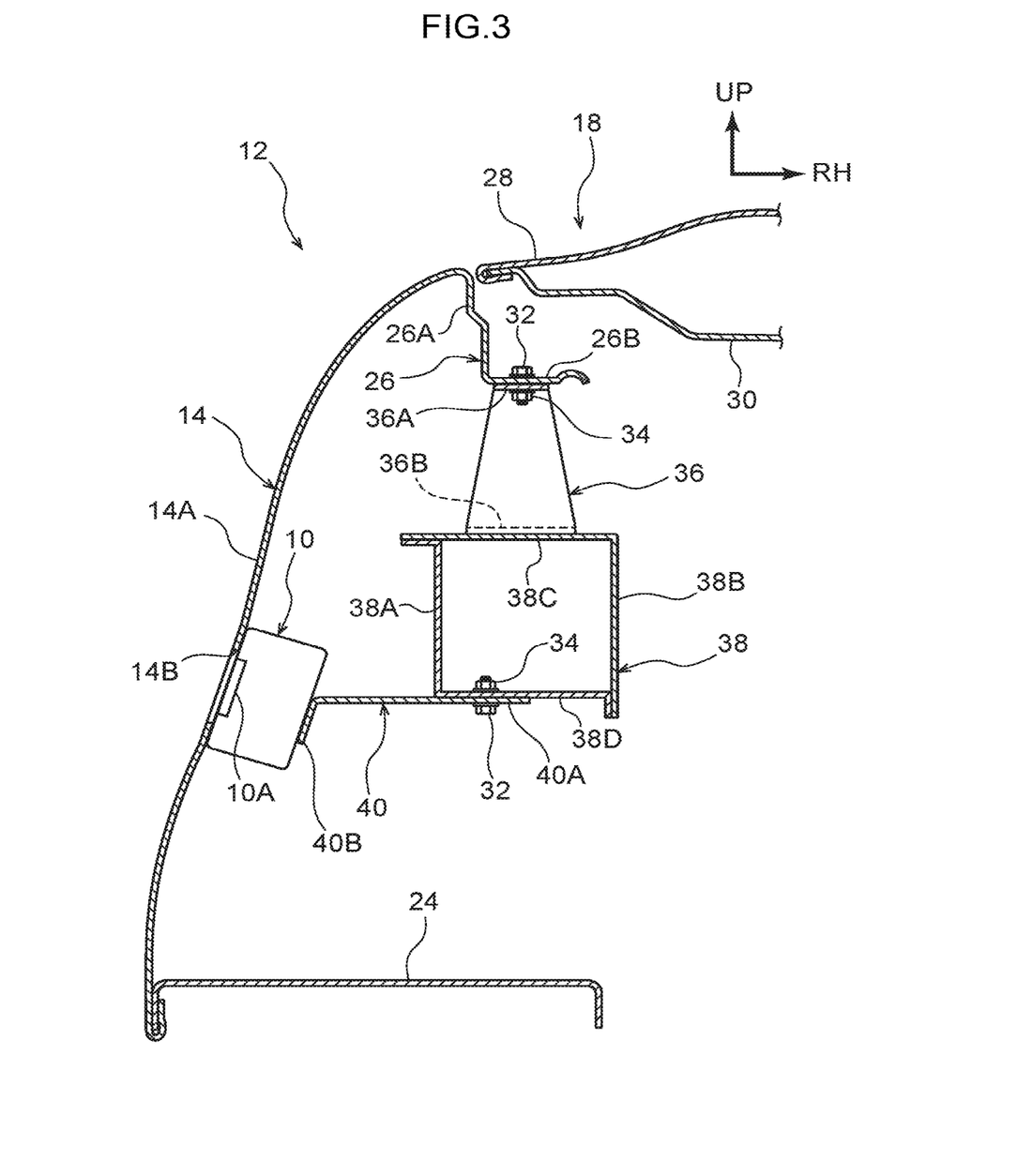
FIG. 3 is a sectional diagram, corresponding to FIG. 2, showing a variant example of the mounting structure for a vicinity information detection sensor in accordance with the first exemplary embodiment.

A structure may be employed in which an opening 14B is provided in the upright wall portion 14A of the fender panel 14 as in the variant example illustrated in FIG. 3. The present variant example has the same structure as the first exemplary embodiment except for the opening 14B being provided in the upright wall portion 14A of the fender panel 14.

The opening 14B is provided at a region of the upright wall portion 14A that opposes the vicinity information detection sensor 10. To be specific, the opening 14B is provided at the region opposing the detection unit 10A of the vicinity information detection sensor 10, and is formed to be a little larger than the detection unit 10A.

According to the present variant example, the detection unit 10A of the vicinity information detection sensor 10 is exposed to the vehicle outer side through the opening 14B in the fender panel 14. Therefore, a reduction in detection accuracy of the vicinity information detection sensor 10 due to soiling and the like of the fender panel 14 may be suppressed. Thus, the detection accuracy of the vicinity information detection sensor 10 may be excellently maintained.

In a structure in which a laser radar is used as the vicinity information detection sensor 10, it is useful to provide the opening 14B such that the laser light is not blocked by the fender panel 14. In this case, a structure may be employed in which the opening 14B is covered by a transparent plate or the like that transmits the laser light, and soiling of the detection unit 10A may be suppressed.

Second Exemplary Embodiment

Now, a mounting structure for a vicinity information detection sensor according to a second exemplary embodiment of the present invention is described with reference to the drawings. Structures that are the same as in the first exemplary embodiment are assigned the same reference symbols and, as appropriate, are not described.

Figure 4:
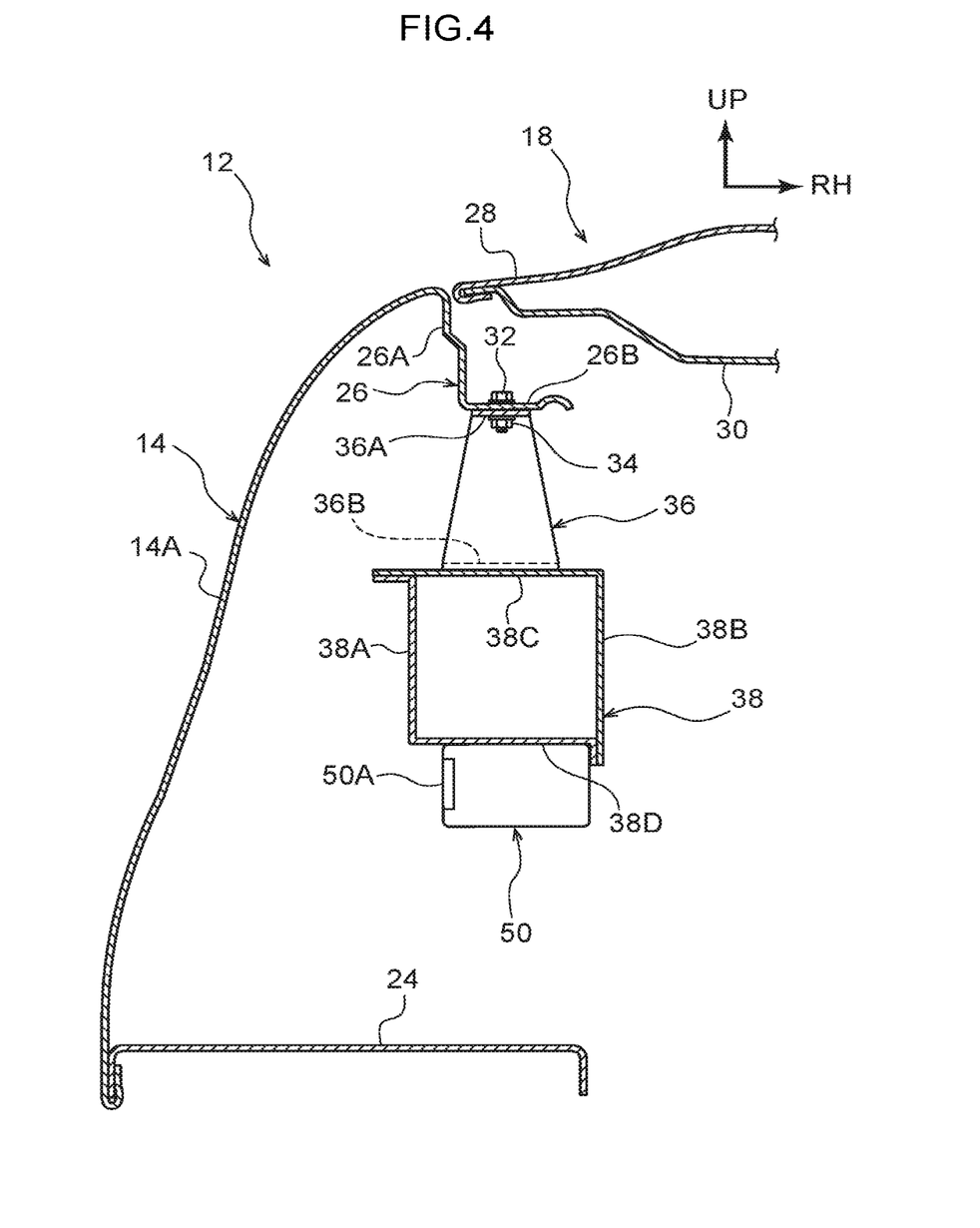
FIG. 4 is a sectional diagram, corresponding to FIG. 2, showing a mounting structure for a vicinity information detection sensor in accordance with a second exemplary embodiment.

As shown in FIG. 4, the present exemplary embodiment differs from the first exemplary embodiment in that a vicinity information detection sensor 50 is mounted directly to the apron upper member 38. In specific terms, the vicinity information detection sensor 50 is formed in a substantially rectangular shape and an upper face of the vicinity information detection sensor 50 is superposed with the lower side wall 38D of the apron upper member 38. In this state, the vicinity information detection sensor 50 is mounted to the lower side wall 38D.

Various methods may be employed for mounting the vicinity information detection sensor 50 to the apron upper member 38. For example, a structure may be used in which a holder is provided at the lower side wall 38D of the apron upper member 38 and the vicinity information detection sensor 50 is retained by this holder. Alternatively, bolt holes may be formed in a casing of the vicinity information detection sensor 50, and the lower side wall 38D and vicinity information detection sensor 50 may be fastened together by bolts.

The vicinity information detection sensor 50 is equipped with a detection unit 50A that detects vicinity information of the vehicle 12. The vicinity information detection sensor 50 is mounted to the apron upper member 38 such that the detection unit 50A is oriented to the vehicle width direction outer side. An end portion at the vehicle width direction outer side of the vicinity information detection sensor 50 is disposed at the vehicle width direction inner side of an end portion at the vehicle width direction outer side of the apron upper member 38. That is, in the present exemplary embodiment the whole of the vicinity information detection sensor 50 is disposed at the vehicle width direction inner side relative to the outer side wall 38A of the apron upper member 38.

Operation and Effects

Now, operation of the present exemplary embodiment is described.

In the present exemplary embodiment, the end portion of the vicinity information detection sensor 50 at the vehicle width direction outer side thereof is disposed at the vehicle width direction inner side relative to the end portion of the apron upper member 38 at the vehicle width direction outer side thereof (the outer side wall 38A). Therefore, when a collision body collides against the side face of the vehicle 12, a collision load is applied to the outer side wall 38A before the vicinity information detection sensor 50. Therefore, damage to the vicinity information detection sensor 50 may be moderated.

Because the vicinity information detection sensor 50 is mounted directly to the apron upper member 38 that is a framework member, the application of vibrations to the vicinity information detection sensor 50 may be suppressed compared to a structure in which the vicinity information detection sensor 50 is disposed away from the apron upper member 38. Thus, the detection accuracy of the vicinity information detection sensor 50 may be improved.

The first and second exemplary embodiments of the present invention have been described hereabove but the present invention is not limited by the structures described above; it will be clear that the present invention may be embodied in numerous modes beside the above structures within a technical scope that does not depart from the gist of the present invention. For example, in the exemplary embodiments described above, the vicinity information detection sensor 10 and the vicinity information detection sensor 50 are formed in substantially rectangular shapes, but this is not limiting. Vicinity information detection sensors with alternative shapes may be employed.

Further, in the first exemplary embodiment, the vicinity information detection sensor 10 is mounted to both the bracket 40 and the fender panel 14, but this is not limiting. For example, a structure is possible in which the vicinity information detection sensor 10 is disposed at a location at which the vicinity information detection sensor 10 does not touch the fender panel 14 and the vicinity information detection sensor 10 is mounted only to the bracket 40.

In the second exemplary embodiment, the vicinity information detection sensor 50 is directly mounted to the lower side wall 38D structuring the lower face of the apron upper member 38, but this is not limiting. For example, a structure is possible in which the vicinity information detection sensor 50 is directly mounted to the upper side wall 38C structuring the upper face of the apron upper member 38. In this structure too, damage to the vicinity information detection sensor 50 when there is a side collision against the vehicle 12 may be suppressed provided that the end portion at the vehicle width direction outer side of the vicinity information detection sensor 50 is disposed at the vehicle width direction inner side relative to the end portion at the vehicle width direction outer side of the apron upper member 38 (the outer side wall 38A).

The structure in which a single vicinity information detection sensor is mounted to the apron upper member 38 is not limiting. For example, a structure is possible in which plural vicinity information detection sensors are mounted to the apron upper member 38 and the vicinity information detection sensors are selected to detect vicinity information in accordance with circumstances.

In the exemplary embodiments described above, the apron upper member 38 is formed with a closed cross section structure, but this is not limiting.

What is claimed is:

1. A mounting structure for a vicinity information detection sensor, comprising:
   an apron upper member being a framework member arranged along a vehicle front-and-rear direction at a vehicle width direction outer side of a vehicle front portion; and
   a vicinity information detection sensor equipped with a detection unit that detects vicinity information of the vehicle, the vicinity information detection sensor being mounted to the apron upper member, directly or via a bracket, such that the detection unit is oriented to the vehicle outer side.

2. The mounting structure for a vicinity information detection sensor according to claim 1, wherein:
   a fender panel is disposed at the vehicle width direction outer side of the apron upper member, and
   the vicinity information detection sensor is mounted to the apron upper member via the bracket and is disposed between the apron upper member and the fender panel.

3. The mounting structure for a vicinity information detection sensor according to claim 2, wherein the vicinity information detection sensor is mounted to both the bracket and the fender panel.

4. The mounting structure for a vicinity information detection sensor according to claim 3, wherein a region of the fender panel that opposes the detection unit is made open.

5. The mounting structure for a vicinity information detection sensor according to claim 1, wherein the vicinity information detection sensor is mounted directly to the apron upper member, and an end portion at the vehicle width direction outer side of the vicinity information detection sensor is disposed at a vehicle width direction inner side relative to an end portion at the vehicle width direction outer side of the apron upper member.

6. The mounting structure for a vicinity information detection sensor according to claim 1, wherein:
   an inlet aperture through which running wind flows into the vehicle interior is provided at a vehicle front side relative to the vicinity information detection sensor, and
   the vicinity information detection sensor is disposed in a ventilation channel for the running wind flowing into the vehicle interior.

7. The mounting structure for a vicinity information detection sensor according to claim 1, wherein the apron upper member is formed as a closed cross section structure including an outer side wall, an inner side wall, an upper side wall, and a lower side wall.

8. The mounting structure for a vicinity information detection sensor according to claim 7, further comprising:
   a fender panel disposed at the vehicle width direction outer side of the apron upper member;
   a bracket mounting portion provided at an upper end portion of the fender, the bracket mounting portion formed in a substantial L-shape and including a first wall projecting to a vehicle lower side and a second wall projecting to a vehicle width inner side from a lower end of the first wall; and
   a support bracket,
   wherein an upper end of the support bracket is connected to the second wall of the bracket mounting portion, and a lower end of the support bracket is connected to the upper side wall of the apron upper member.

* * * * *